United States Patent [19]
Ronden et al.

[11] 3,910,744
[45] Oct. 7, 1975

[54] APPARATUS FOR BELLING PLASTIC PIPE

[75] Inventors: Clifford P. Ronden; Imre Rabel, both of Edmonton, Canada

[73] Assignee: Grandview Industries, Limited, Canada

[22] Filed: May 28, 1970

[21] Appl. No.: 41,267

[52] U.S. Cl. ............... 425/384; 264/322; 425/393; 425/153; 425/457
[51] Int. Cl. ............................................. B29c 17/07
[58] Field of Search...... 18/19 TE, 19 TH, 4 P, 4 R, 18/DIG. 41, DIG. 39, 19 BE, 2 HA, 45 R; 264/322

[56] References Cited
UNITED STATES PATENTS 3,205,535  9/1965  Niessner et al. ............... 18/19 TE X
3,553,780  1/1971  Kuhlemann ...................... 18/19 TE FOREIGN PATENTS OR APPLICATIONS
1,087,168  10/1967  United Kingdom............... 18/19 TE

*Primary Examiner*—Robert L. Spicer, Jr.
*Attorney, Agent, or Firm*—Roylance, Abrams, Berdo & Kaul

[57] ABSTRACT

Apparatus for belling the end of a thermoplastic pipe by heating the end to soften the same, inserting an expansible belling head into the softened end to form the plastic material into the shape desired, and collapsing and withdrawing the belling head.

16 Claims, 14 Drawing Figures

INVENTORS
IMRIE RABEL
CLIFFORD P. RONDEN
BY Roylance, Abrams, Kruger, Berdo & Kaul
ATTORNEYS

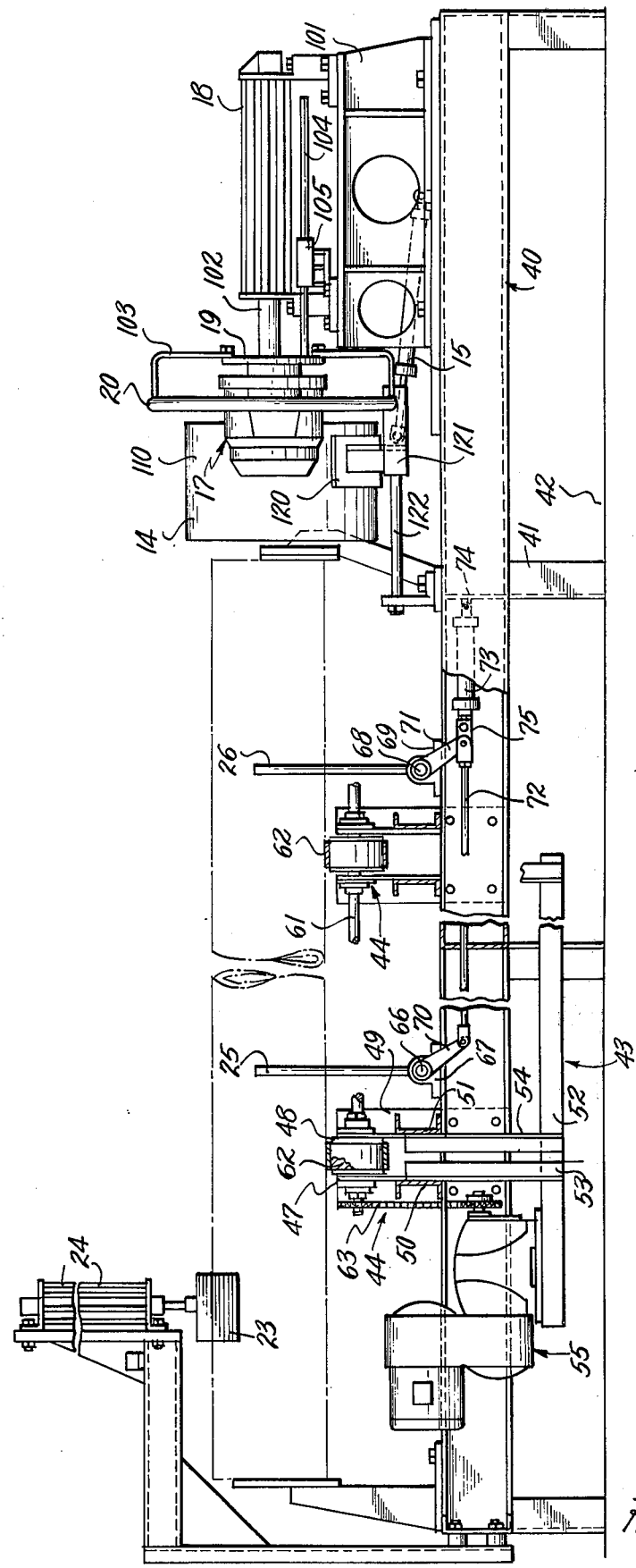

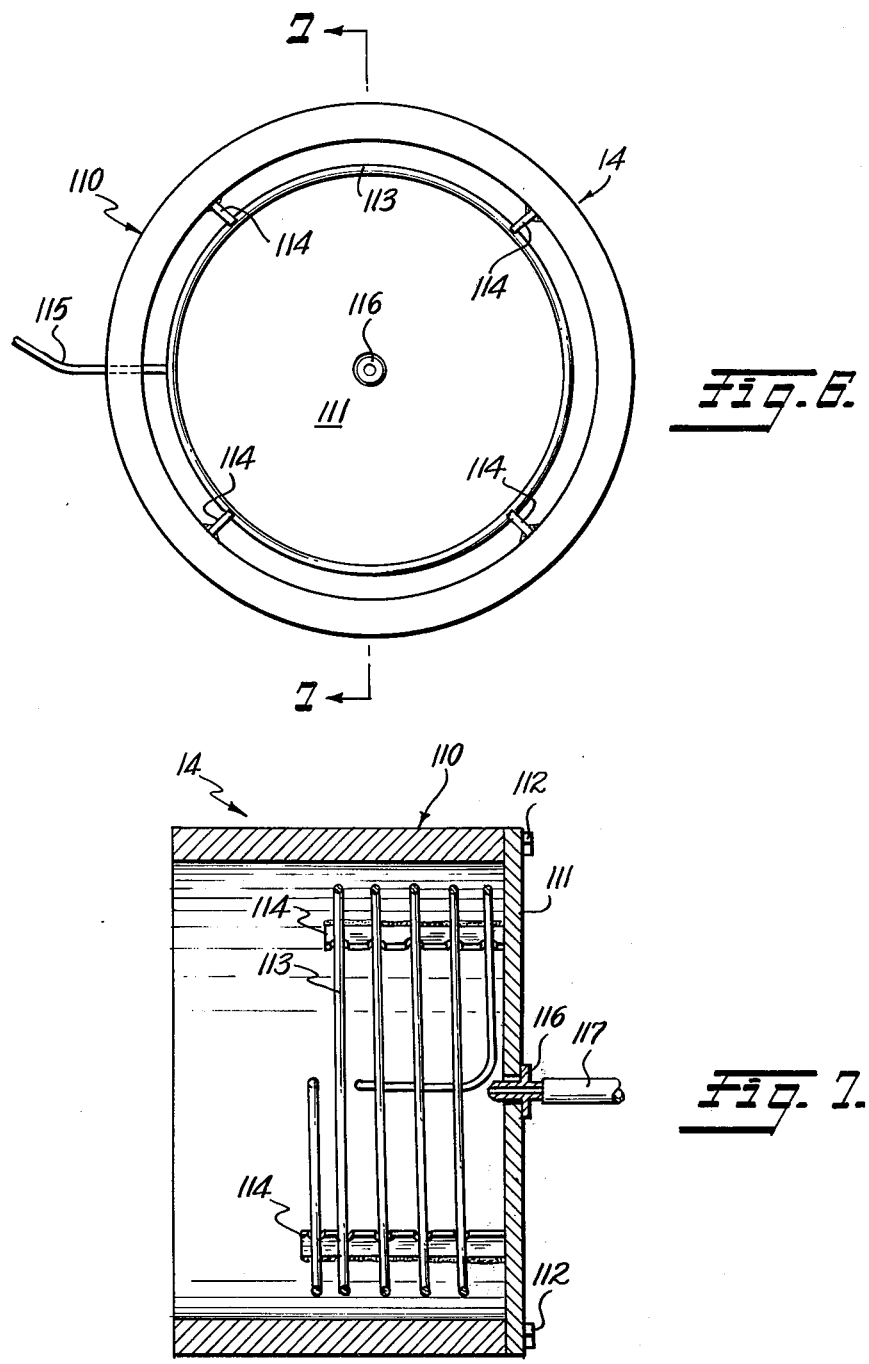

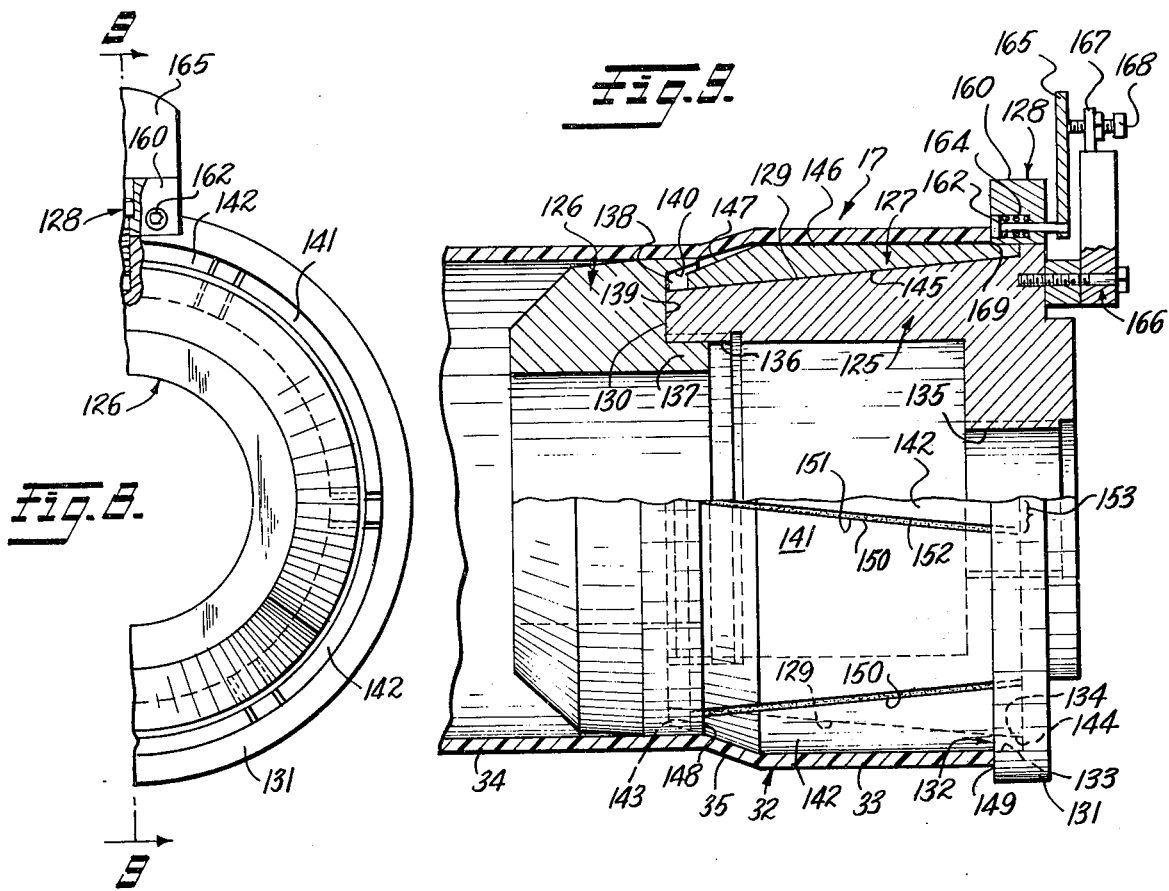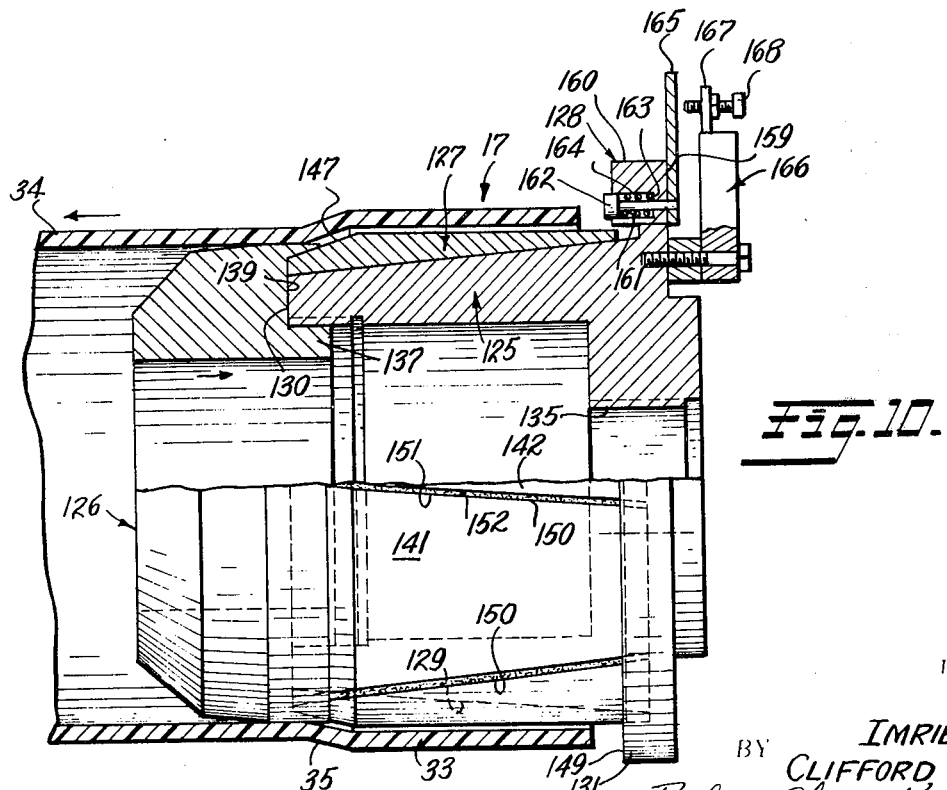

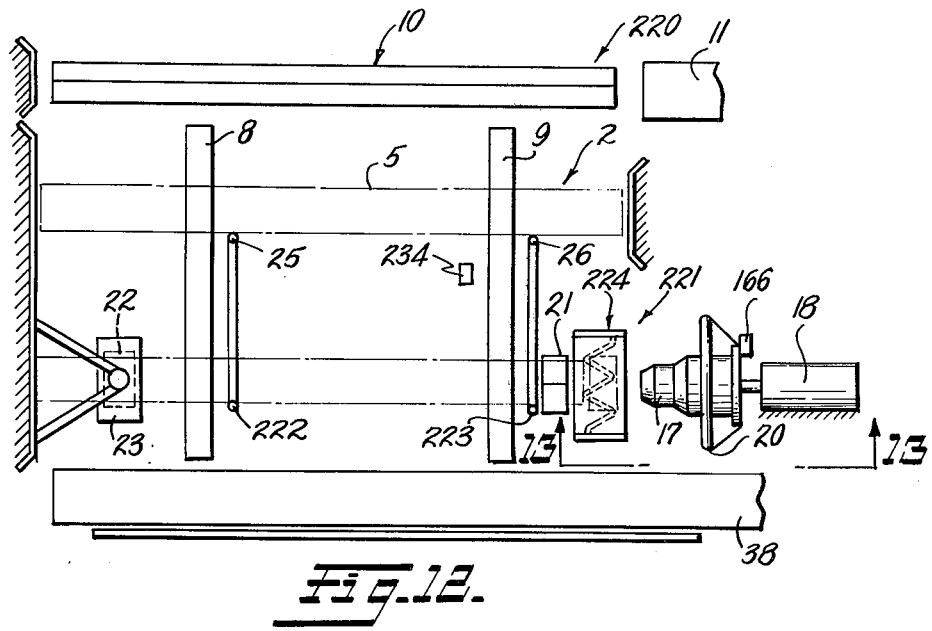
Fig. 12.
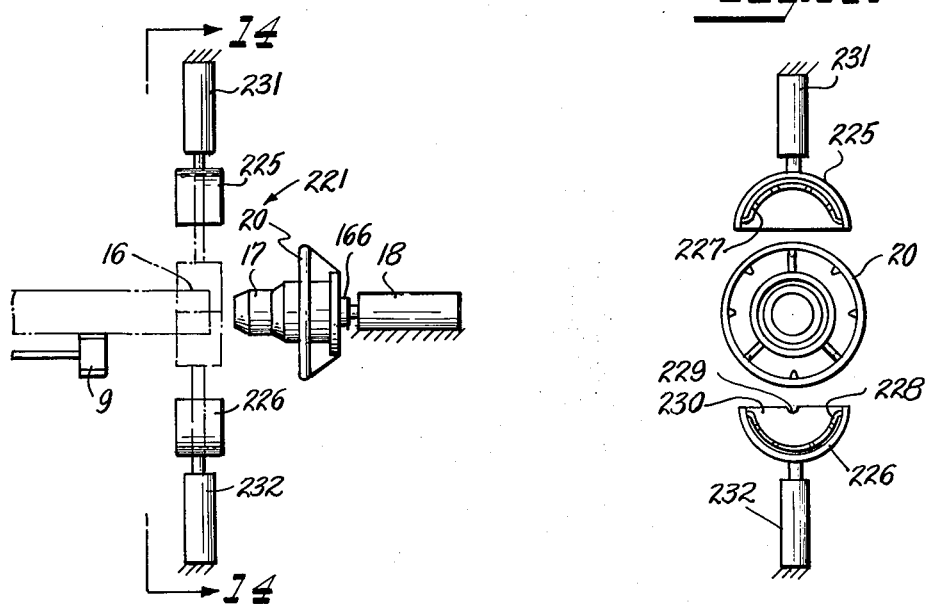
Fig. 13.
Fig. 14.
INVENTORS
IMRIE RABEL
CLIFFORD P. RONDEN
BY Roylance, Abrams, Kruger, Berdo & Kaul
ATTORNEYS

APPARATUS FOR BELLING PLASTIC PIPE

This invention relates to a unique method and apparatus for belling pipe, and particularly to a method and apparatus for belling pipe or tubing formed from a heat softenable thermoplastic material.

Rigid thermo-plastic pipe is now manufactured in many different sizes and is used extensively in lieu of metal pipe. Rigid plastic pipe is usually formed by extrusion, and is cut into lengths to facilitate storage and handling. Connecting sections of the pipe is an expensive and time consuming operation unless one end of each section of pipe has a bell end or socket to receive the other end of an adjacent pipe. The pipe sections can then be readily connected together and cemented, if desired, to form a fluid-tight joint.

In accordance with one embodiment of this invention, a bell end is formed on a length of pipe as the pipe is conveyed laterally through a plurality of work stations. At one station an end of the pipe is cleaned by an air blast and is heated to the softening temperature of the plastic material. The pipe is then transferred to a belling station where the heat softened end of the pipe is expanded to form a bell end of the required dimensions. The bell end is formed by forcing a mandrel of an exterior configuration the same as the interior of the desired bell end into the heat softened end of the pipe and then cooling the end of the pipe prior to withdrawing the mandrel. Then, the mandrel is withdrawn from the belled end of the pipe. The mandrel is so formed that it contracts as it is withdrawn from the pipe and correspondingly, the mandrel is readily removable from the pipe.

In one preferred embodiment of this invention, the pipe is transported laterally to the heating and bell forming stations by a continuously driven conveyor. Automatically actuated stops position the pipe at the heating station in alignment with a heating drum that is moved to a position surrounding the end of the pipe. At the belling station automatically actuated stops initially position the pipe and in addition, a cradle lifts the pipe from the conveyor to a position in which the heated end is aligned with the belling mandrel. The entire operation is performed automatically and requires no manual manipulation or intervention.

In another embodiment of the invention, the pipe is heated, belled, and cooled at a single station where the several operations are performed automatically and no manual assistance is required.

A unique mandrel is used to bell or expand the heat softened end of the pipe. The mandrel has an expandable assembly of slip segments which, in the expanded condition, presents an external surface configuration corresponding to the internal configuration of the bell to be formed on the end of the pipe. The slip segments are arranged for axial movement along a conical portion of the mandrel. The arrangement is such that the slip segments are free to slide axially along the cone shaped portion of the mandrel. Hence, when the belling head is forced into the heat softened end of the pipe, the slip segments engage and are resisted by the pipe and therefore move axially, relative to the mandrel, to the expanded position and form a bell of the desired diameter and configuration on the end of the pipe. During movement of the mandrel into the pipe, the pipe is firmly held against axial movement by a fence which engages its opposite end. Advantageously, the cone shaped portion of the mandrel has an angle with the axis of the mandrel that is sufficiently small that the slip segments do not tend to slide axially as a result of forces due to shrinking of the pipe end during cooling. After the bell is formed and the pipe end is cooled, movement of the belling head out of the pipe causes the slip segments to contract so the pipe is released from the mandrel.

A unique control assures the forming of a bell of precisely the same length on each pipe processed even though the length of successive sections of pipe may vary somewhat. This is accomplished by automatically terminating forward movement of the mandrel into the pipe in response to full seating of the mandrel in the pipe. During withdrawal of the mandrel, the clamping cylinder holds the pipe against axial movement with the belling mandrel.

Advantageously, the steps of heating, belling, and cooling are controlled in timed relation to each other so a perfect bell of the same size and length is formed on the end of each pipe passed through the belling apparatus. A simple, yet efficient stop system, including retractable and extendable stop rods or pins, assure proper positioning of the pipe at each work station of the belling apparatus.

Correspondingly, an object of this invention is a method and apparatus for belling plastic pipe capable of being softened.

Another object is an apparatus for forming a bell end on heat softenable thermo-plastic pipe to facilitate connecting sections of the pipe in end to end relation.

Another object is an apparatus for belling plastic pipe in which the entire operation is completely automatic and requires no manual effort or intervention.

Another object is an apparatus for belling pipe in which the pipe transporting conveyor is vertically adjustable to facilitate adjusting and adapting the apparatus to bell pipe of at least several different diameters.

A further object is an apparatus for belling plastic pipe in which the pipe is transported laterally through the apparatus, is precisely position at work stations via automatic retractable stop means, is rotated by the transporting conveyor while being restrained against transverse movement by the stop means at a heating station, so the end of the pipe is uniformly heated and softened, is gripped and lifted at the belling station to a position in precise alignment with the belling mandrel, is cooled prior to removal from the belling mandrel, and includes provision for assuring the same length and diameter of bell on each pipe processed regardless of normal variations in the length of the pipe sections passed through the apparatus. A further object is a pipe belling device in which the pipe belling mandrel is pressed into the softened end of a pipe, and in which the belling mandrel has an expandable slip segment which contracts automatically in response to axial movement of the belling mandrel out of the end of the belled pipe.

Numerous other objects, features, and advantages of this invention will become apparent with reference to the drawings which form part of this specification, and in which:

FIG. 2 is a front elevational view of the belling apparatus of FIG. 1, with portions of the apparatus cut away;

FIg. 6 is a front elevational view of the heating head without its supporting cradle;

FIG. 7 is a transverse sectional view of the heating head taken along line 7–7 of FIG. 6;

FIG. 8 is a partial front elevational view of the belling head;

FIG. 9 is a view in section taken along line 9—9 of FIG. 7, and showing a belled pipe fully seated on the belling head;

FIG. 10 is a view corresponding to FIG. 9, but showing the position of the parts of the belling head when the belling head is partially withdrawn from the bell end of a pipe;

FIG. 12 is a top plan view of a second embodiment of the belling apparatus of this invention;

FIG. 13 is a side elevational view taken along line 13—13 of FIG. 12; and

FIG. 14 is an end elevational view taken along line 14—14 of FIG. 13.

Figure 1:
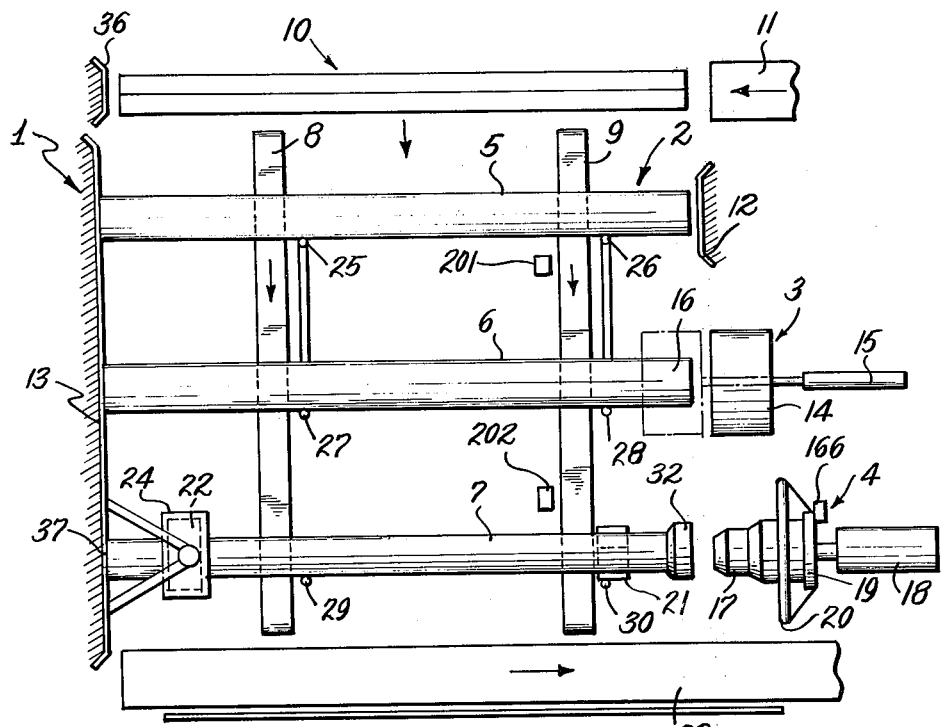
FIG. 1 is a simplified plan view of a first embodiment of the belling apparatus of this invention.

Referring now to the drawings, and particularly to FIG. 1, there is shown in simplified form a first embodiment of the pipe belling apparatus of this invention. In this embodiment, the belling apparatus 1 includes a positioning station 2, a heating station 3, and a belling station 4. As shown, there is a length of thermoplastic pipe 5 at positioning station 2, a length of thermo-plastic pipe 6 at heating station 3, and a length of thermo-plastic pipe 7 at belling station 4. The pipe is moved intermittently and sequentially to stations 2, 3 and 4 in a direction transversely of its length by a continuously driven conveyor belt having a pair of spaced apart parallel belts 8 and 9.

Lengths of pipe are fed one by one onto the conveyor belts by an infeed conveyor system including a pivoted pipe transfer device 10 and a conveyor 11 which feeds a length of pipe onto the pipe transfer device. Actuation of pipe transfer device 10 causes a length of pipe to be deposited on conveyor belts 8 and 9. The conveyor belts transport the pipe to positioning station 2. During the travel of the pipe to the positioning station, the pipe is guided axially of its length by front fence 12 and rear fence 13, which assure that the pipe on the conveyor is properly positioned axially.

At heating station 3 there is a hollow cylindrical heating head 14. The heating head is movable to the extended dotted line position and to the retracted solid line position shown at FIG. 1 by a motor in the form of air cylinder 15. In the extended or advanced (dotted line) position the heating head surrounds the front end 16 of pipe 6 at heating station 3.

At belling station 4 there is a belling head 17. The belling head is advanced and retracted by a motor in the form of air cylinder 18. Mounted on the belling head at a location in front of stop flange 19 is a cooling ring 20 of a diameter greater than the diameter of the bell to be formed on the largest diameter of pipe to be handled by the apparatus. Cooling ring 20 is provided with a plurality of nozzles directed toward the belling head and through which air is forced to cool the end of the pipe after a bell is formed on the pipe.

At belling station 4 there are a pair of lift cradles 21 and 22 located respectively on opposite sides of belts 8 and 9. Lift cradles 21 and 22 normally occupy a retracted position below the top of conveyor belts 8 and 9, but are extendable to lift a pipe at station 4 upwardly, out of engagement with the conveyor belts, and into precise axial alignment with belling head 17. A clamp 23, above and vertically aligned with cradle 22, is arranged to clamp the pipe against cradle 22, when air cylinder 24 is actuated.

Transverse movement of the pipe through the belling apparatus to the several stations 2–4 is controlled by stop rods, two of which are located at each of the stations. As shown at FIG. 1, the stop rods 25 and 26 are in spaced apart relation at station 2. Stop rods 27 and 28 are in spaced apart realtion at station 3, and stop rods 29 and 30 are in spaced apart relation at station 4. Each pair of stop rods is movable simultaneously between an extended position in which the rods project into the path of travel of a pipe on conveyor belts 8 and 9, and a retracted position in which pipe on the conveyor is released to be transported to the next station by the conveyor belts. With the rods in extended position, the pipe is merely held against transverse movement, but is rotated by the continuously driven conveyor, at both stations 2 and 3.

As shown at FIGS. 1, 9 and 10, the several embodiments of the pipe belling apparatus of this invention form a bell shaped end 32 on one end of a length of thermo-plastic pipe. It will be observed with reference to FIG. 9 that end 32 is of the so-called single bell type having an enlarged cylindrical end portion 33 connected to the body 34 of the pipe by a short tapered section 35. While the bell 32 is of the type having especial utility for joining together sections of plastic pipe of like diameter, it is to be understood that the belling apparatus of this invention can be used to form the so-called "double bell" end, as well as "adapter" type ends on plastic pipe of various sizes.

SUMMARY OF OPERATION

Pipe to be belled is transported longitudinally by conveyor 11 to transfer device 10 and into engagement with stop fence 36, which positions the pipe for transfer to belts 8 and 9. The transfer device 10 is actuated to transfer the pipe to belts 8 and 9 of the conveyor. The belts move the pipe to the position of pipe 5 at FIG. 1 where further transverse movement of the pipe by the conveyor belts is prevented by the extended stop rods 25 and 26. When stop rods 25 and 26 are retracted, the pipe is released and is transported by the conveyor belts to station 3 where the pipe is again stopped by the stop rods 27 and 28. The action of stop rods 27 and 28 is such that only transverse movement of the pipe 6 is prevented, but the pipe is still resting on the conveyor belts and is therefore rotated by the belts. Stop rods 27 and 28 are so positioned that a pipe 6 engaging the rods at station 3 is axially aligned with heating head 14. The heating head is then advanced to the position shown in dotted lines where it extends around end 16 of the pipe. As soon as the heating head 14 moves to the advanced position, an air blast of short duration from an air nozzle at the center of the heating head clears chips and other foreign matter from the inside of the pipe end 16.

When end 16 of the pipe is sufficiently heated, heating head 14 is retracted, stop rods 27 and 28 are retracted, and the pipe is transported by the conveyor belts to station 4 where its transverse movement is again arrested by stops 29 and 30.

At station 4, the operation is slightly different from the operation at station 3. At station 4, cradles 21 and 22 are elevated to lift the pipe out of engagement with conveyor belts 8 and 9. In addition, the clamp 23 is activated so the pipe is gripped by the cradle 22 and clamp 23. The cradles are so arranged that in the extended position, they position the pipe in precise axial alignment with belling head 17. With the pipe in the elevated position, belling head 17 is advanced into the heat softened end 16 to form the bell end 32 on the end of the pipe. During the forward motion of belling head 17 into the pipe, axial movement of the pipe is resisted by engagement of its opposite end 38 with rear fence 13. After belling head 17 is fully seated in the pipe, cooling air is forced through the nozzles of cooling ring 20 to cool the now belled end 32 of the pipe before the belling head 17 is withdrawn. When the pipe is cooled to a temperature below its softened temperature, the belling head is withdrawn, cradles 21 and 22 are lowered so the pipe again rests on conveyor belts 8 and 9, and stop rods 29 and 30 are then retracted to allow the conveyor to move the pipe to the outfeed conveyor 38, which conveys the pipe away from the bell forming apparatus.

DETAILED DESCRIPTION OF FIRST EMBODIMENT

Figure 3:
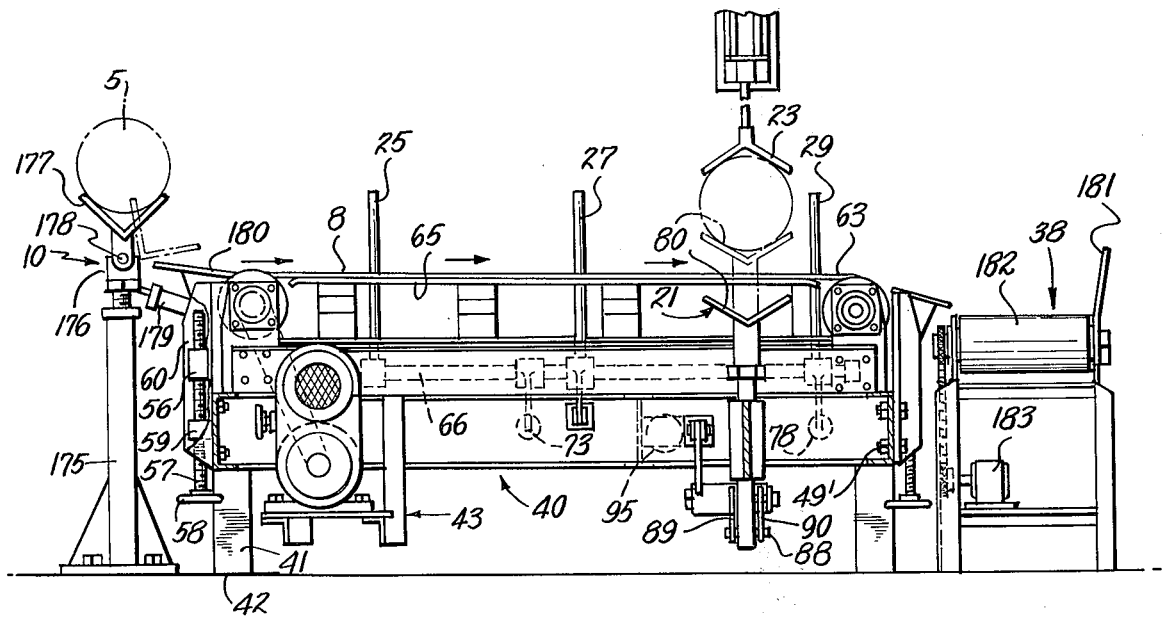
FIG. 3 is an end elevational view of the belling apparatus of FIG. 1, with portions thereof cut away.

FIGS. 2–5 show additional details of the first embodiment of the pipe belling apparatus of this invention. As shown at FIGS. 2 and 3, the various parts of the belling apparatus 1 are mounted on a rigid main frame 40 comprised of structural steel elements, such as I beams and C beams suitably secured together with bolts, rivets, or by welding, and is supported on vertical legs 41 anchored to the floor 42 of the building where the unit is installed. In addition to the main frame 40, there is also a conveyor supporting subframe 43 supported by the frame 40 for vertical movement so the height of the conveyor can be adjusted. Subframe 43 includes a pair of spaced apart conveyor support pedestals 44 at the infeed side of the apparatus, and a pair of spaced apart pedestals 45 at the discharge side of the apparatus. The pairs of pedestals 44 and 45 are arranged in a generally rectangular array with respective pedestals 44 at one side of the apparatus aligned respectively with the pedestals 45 at the other side of the apparatus, and with the respective pairs of pedestals aligned with each other longitudinally of the apparatus. Each pedestal includes a pair of upright, parallel, spaced apart plates 47 and 48, as shown at FIG. 2. Joining the plates 47 and 48, along their outer edges, is a vertical slide plate 49 which, in the case of each pedestal lies in a plane transversely outwardly of the main frame longitudinal beams 49'.

Joining the pairs of pedestals at opposite sides of the apparatus are two pairs of transversely extending C beams 50 and 51. The pairs of C beams 50 and 51 function to rigidly interconnect each pedestal 44 at one side of the conveyor with the respective opposed pedestal 45 at the other side of the conveyor. A motor support frame 52 is secured to each pair of C beams 50 and 51 by a downwardly extending pair of support members 53, 54 formed from angle iron. The motor support frame 52 is elongated, as shown at FIG. 2, and functions to connect the two pairs of C beams 50 and 51 together and increase the rigidity of conveyor supporting subframe 43. Mounted at one end of motor support frame 52 is a combined drive motor-reduction gear assembly 55 which drives conveyor belts 8 and 9. Advantageously, the gear reduction unit is of the variable speed type to permit adjusting the speed of the conveyor belts for optimum operation of the apparatus.

Secured to and projecting outwardly from each slide plate 49 is a threaded bushing 56, as shown at FIG. 3. Threaded into bushing 56 is an elongated adjusting screw 57 with a hand wheel 58 at its lower end. The adjusting screw extends through a collar 59 fixed to main frame 40. The connection between the collar and the adjusting screw of such that the screw is free to rotate, but is restrained from axial movement.

Each slide plate 49 rides in a T-shaped slot formed in standards 60. The slot is carefully machined so each plate 49 can be adjusted vertically, but is restrained from movement transversely or longitudinally of the conveyor so the several parts of the conveyor remain in precise alignment during vertical adjustment. While the details of only one standard have been explained in detail, it is to be understood that all standards are identical and provide for adjusting the vertical height of the conveyor belts 9 and 10 relative to frame 40.

Extending through the pedestals 44 is a drive shaft 61. The drive shaft is journaled for rotation in the pedestals. Secured to drive shaft 60, for rotation with the shaft, are conveyor drive wheels 62 which are located respectively between the supporting plates 50 and 51 of the pedestals 44. The drive shaft is driven by the motor-reduction gear unit 55 via suitable sprockets and a drive chain 63. Pedestals 45, at the opposite side of the apparatus, provide journals for idler wheels 64.

Figure 4:
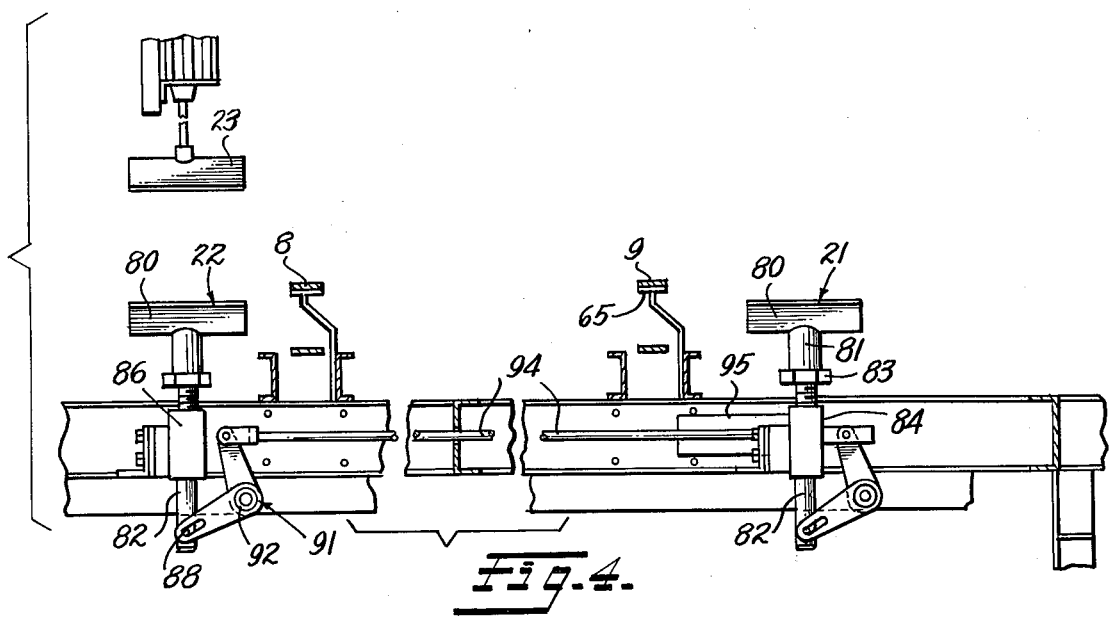
FIG. 4 is a partial view showing the mechanism for operating the pipe lifting cradles at the belling station.

Conveyor belt 8 extends around the drive wheel 62 and idler wheel 64 of the pedestals at one end of the apparatus, whereas belt 9 extends around the drive pulley and idler pulley of the pedestal at the other end of the apparatus. An elongated belt support plate 65 extends under the upper run of each conveyor belt to prevent sagging of the belts and to maintain the height of the upper portion of the belt constant for any particular setting of the conveyor frame. Because of the substantial distance between the drive wheels 62 and idler wheels 63, this support is desirable to avoid sagging of the conveyor belts 8 and 9. The conveyor support plates 65 are secured to the C beams 50 and 51, as shown at FIG. 4. Since pedestals 44 and 45, as well as motor-reduction gear unit 55 are mounted on the same rigid conveyor frame, vertical adjustment of the conveyor can be readily accomplished, even while the conveyor belts are moving, by rotating the adjusting screws 57. Since the motor and the conveyor belt supporting pedestals are all mounted on the same frame, the distance between the motor drive sprocket and the drive shaft driven sprocket remains constant and hence, there is no need to adjust the chain 62.

As shown at FIGS. 2 and 3, a shaft 66 of a length approximately the same as the width of the frame 40 extends transversely of the frame and has its ends suitably journaled as by bearing blocks 67. As shown at FIG. 3, the stop rod 25 and stop rod 27 are secured to shaft 66 so the stop rods advance and retract upon rotation of the shaft. Advantageously, the connection between stop rod 27 and shaft 66 is releasable so the stop rod may be adjusted along the axis of the shaft. Similarly, there is a shaft 68 of the same length as shaft 66, and which has its ends journaled in bearing blocks 69. Stop rods 26 and 28 are secured to shaft 68, the connection between stop rod 28 and the shaft providing for adjustment of this stop rod along the length of the shaft. Secured to shaft 66, at a location between stop rods 25 and 27, is a crank arm 70. A crank arm 71 is similarly secured to shaft 68 at a location between stop rod 26 and 28, the two crank arms being aligned longitudinally of frame 40. Crank arm 70 is mechanically connected to crank arm 71 by a push rod 72, so shafts 66 and 68 rotate in unison. Stop rod operating cylinder 73 has one end pivotally connected to main frame 40 at a pivot connection 74. The piston rod end is pivotally connected to rod 72 at pivot connection 75. As shown in FIGS. 2 and 3, stop rods 25–28 are in their extended positions. Operating cylinder 73 rotates stop rods 25–28 in a clockwise direction simultaneously to move the rods to a retracted position in which they are beneath the level of the upper surfaces of conveyor belts 8 and 9.

Stop rods 29 and 30 are not secured to the respective shafts 66 and 68, but instead are mounted for pivotal movement relative to the respective shafts. The connection between the shaft and the stop rods includes a collar to which the rod is connected and which functions as a bearing for movement of the stop rods relative to the shaft. Secured to the collar for each stop rod 29 and 30 is a downwardly extending crank arm 77 (FIG. 3). The ends of the respective crank arms 77 for stop rods 29 and 30 are interconnected for simultaneous pivotal movment by a push rod (not shown) identical to the push rod 72 previously explained. The end of the push rod is pivotally connected to a motor, namely, the pneumatic cylinder 78, shown at FIG. 3. By virtue of this arrangement, it is apparent that stop rods 29 and 30 move simultaneously upon operation of cylinder 78, and that this motion is independent of the motion of stop rods 25–28.

FIGS. 3 and 4 show the details of the cradles 21 and 23, and the operating mechanism for these cradles. As shown at FIGS. 1 and 4, cradles 21 and 23 are located on opposite sides of conveyor belts 8 and 9. Cradles 21 and 23 are identical, and as shown at FIG. 3, the upper end of each cradle takes the form of a V block 80 having inwardly sloping upwardly facing surfaces which prevent a pipe from rolling off the cradle and which assures precise positioning of the pipe horizontally, relative to the belling head, when the cradles are elevated to lift a pipe. Secured to and extending downwardly from V block 80 is a threaded sleeve 81 (FIG. 4). The threaded sleeve provides for mounting the V block 80 on the threaded upper end of an elevating shaft 82, for vertical adjustment. A lock nut 83 provides for securing the cradle to the shaft at the adjusted position. The elevating shaft 82 for cradle 21 extends through a guide bushing 84 secured to the main frame with its axis vertical. Similarly, the elevating shaft 82 of cradle 23 extends through a guide bushing 86. Extending transversely through the lower end of each elevating shaft 82 is a pin 87 which engages in slots 88 of a pair of parallel crank arms 89, 90 of a bell crank assembly 91, and between which arms the elevating shaft extends. Bell crank assembly 91 is mounted for pivotal movement on a shaft 92, and includes an upwardly extending crank arm 93. Arms 93 are pivotally connected respectively to the opposite ends of a push rod 94. Pneumatic cylinder 95, offset to one side of rod 94, is pivotally connected to the main frame at one end and is pivotally connected to push rod 94 at its other end. The arrangement is such that when cylinder 95 is operated, its piston rod extends, and cradles 21 and 23 are simultaneously moved to the elevated dotted line positions shown at FIG. 3, in which a pipe lifted by the cradles is above the level of conveyor belts 8 and 9.

As shown at FIGS. 2–4, the assembly including clamp 23 and air cylinder 24 is supported on an L-shaped support structure 100 secured to one end of main frame 40. Clamp 23 takes the form of a V block of the same size as the V block 80 which forms the upper end of cradles 21 and 22. Clamp 23 and cradle 22 are vertically aligned with each other.

Heating head 3 and belling assembly 4 are supported at the same end of main frame 40 as front fence 12. The support for belling assembly 4 (FIGS. 2 and 5) includes a pedestal 101 secured to main frame 40. Secured to the pedestal is pneumatic cylinder 18 which has a piston rod 102. Piston rod 102 is secured to flange 19 which supports cooling air ring 20 via suitable L-shaped support arms 103, which support the air ring 20 at a location around the slip segment portion of belling head 17. Belling head 17 is removably secured to the threaded forward end of flange assembly 19, so it can be readily removed and replaced.

Because of the substantial forward travel of belling head assembly 19, when the assembly is moved to the extended position, additional support is required to prevent bending of piston rod 102. This additional support is provided by guide rods 104, secured to the rear flange assembly 19 and which slide in support bearings 105 located respectively at each side of air cylinder 18 and secured to pedestal 101. In view of the above explanation, it will be apparent that cooling ring 20 remains in the same position relative to belling head 17 throughout the advancing and retracting movement of the belling head.

Figure 5:
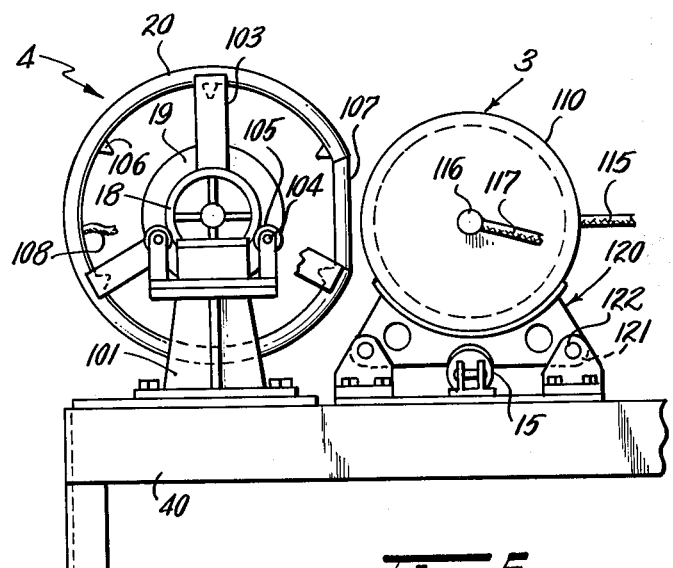
FIG. 5 is a rear elevational view of the heating head assembly and belling head assembly.

As shown at FIG. 5, cooling ring 20 has a diameter substantially greater than the diameter of the belling head. The cooling ring is mounted in concentric relation to the belling head and includes a plurality of nozzles 106 equally circumferentially spaced and extending generally inwardly of ring 20 to direct cooling air toward the end of a pipe on the belling head. To provide for a more compact apparatus, portion 107 of the cooling ring is flattened so the heating head assembly 3 can be placed closely adjacent belling head asssembly 4 without interference during movement of the respective heating and belling heads. Cooling air is suppled to the cooling ring from a suitable source of compressed air via flexible hose 108.

Heating head 14 is mounted beside belling head assembly 4, as previously explained. As shown at FIGS. 5–7, the heating head includes a hollow cylindrical shell 110 which is advantageously insulated to prevent heat loss. A cover plate 111 is secured to one end of the shell as by bolts 112. Mounted within shell 110 is a heating element 113 which takes the form of a helically wound coil of a electrical heating element material. The several turns of the coil are maintained in spaced relation to each other by a plurality of coil support elements 114 secured to and extending radially inwardly from the inside surface of shell 110 in equally spaced relation circumferentially of each other. The ends of heating coil 113 extend through openings in the side of shell 110 to facilitate connection of cables 115 from a suitable electric power source.

Extending through cover plate 111 at its geometric center is a cleaning air nozzle 116. Nozzle 116 is provided with air from a suitable source via the flexible hose 117.

As shown at FIGS. 2 and 5, heating head 14 is mounted on a cradle 120. Cradle 120 has a contour conforming to the arcuate configuration of the lower portion of shell 110 and is secured to the heating head in any suitable manner, for example, by welding. A pair of bearings 121 are secured to cradle 120. These bearings are spaced apart from each other and have parallel axes. The bearings in turn are mounted on and slidable along shafts 122, which are parallel with each other, spaced apart the same distance as the axes of bearings 121, and rigidly secured to main frame 40 at their opposite ends. Connected to the horizontal center of cradle 120 is air cylinder 15 which moves the heating head to its extended and retracted positions. The piston rod of cylinder 15 is pivotally connected to the cradle, and the opposite end of the cylinder 15 is also pivotally connected to main frame 40.

When cylinder 15 is activated to extend the piston rod, heating head 14 slides forward along slide shafts 122 to the dotted line position of the heating head, as shown at FIG. 1. When cylinder 15 is operated to retract the piston rod, heating head 14 returns to its retracted position, as shown in solid lines at FIG. 1.

As shown in FIGS. 8–10, belling head 17 includes a cylindrical body 125, a cylindrical nose 126, a slip segment assembly 127 and a limit switch trip assembly 128. Body 125 is hollow and has a frusto-conical exterior surface 129. Advantageously, frusto-conical surface 129 extends at an angle of 5° with the axis of body 125. The frusto-conical surface 129 terminates at a transverse annular front face 130 of body 125. At the other end, body 125 has an outwardly projecting cylindrical flange 131. Flange 131 has an annular groove 132 formed therein. The groove 132 is defined by a cylindrical inner surface 133, a transverse annular shoulder 134, which faces toward nose 126, and the frusto-conical surface 129 terminates at shoulder 134.

Body 125 is hollow and has an internally threaded bore 135 at its flange end, and via which belling head 17 is threaded onto and secured to flange assembly 19. In addition, there is a larger diameter threaded bore 136 to receive the externally threaded sleeve 137 of nose 126.

Nose 126 is formed with recess 138 which provides a transverse annular shoulder 139 that abuts the front face 130 of body 125. Recess 138 is so formed that a tapered circumferential lip overlaps the front end of body 125. The lip has an inwardly facing frusto-conical surface 140 which forms an acute angle of 20° with the axis of the belling head.

Slip segment assembly 127 is comprised of a plurality of slip segments 141 and 142. The slip segments each have a length, as measured between front shoulder 143 and rear shoulder 144 of the slip assembly, which is somewhat less than the distance between shoulder 139 and shoulder 134. Hence, the slip segment assembly is free to slide axially along conical surface 129 within the limits of the shoulders 139 and 134. The inside surface 145 presented by the slip segments is frusto-conical and makes the same 5° angle with the axis of the belling head as frusto-conical surface 129 of body 125.

When slip segment 127 is in the position of FIG. 9, the slip segments are in their expanded condition and present a cylindrical surface 146 with a diameter corresponding to the internal diameter of the bell to be formed on the end of a pipe. The tapered front portion 147 of the slip segments makes an angle of 20° with the axis of the belling head, and as will be recalled, this 20° angle is the same as the angle of inwardly facing surface 140 of nose 126. Hence, when slip segment assembly 127 is moved toward nose 126, surface 140 acts on surface 147 to contract the slip segments. The distance between rear edge 148 of surface 140 and surface 149 of flange 131 is slightly less than the length of the slip segment assembly, so the slip segments can not fall off the assembled belling head.

As will be observed with reference to FIGS. 8–10, the slip segments 141 differ from slip segments 142, in that each slip segment 141 has its sides 150 cut at an angle so that segment becomes circumferentially narrower in a direction toward flange 131. On the other hand, each slip segment 142 has its side edges 151 cut at an angle so the segment becomes circumferentially wider in a direction toward flange 131. The side edges 150 are spaced from side edges 151, and a filler strip 152 of uniform thickness and formed from a resilient material, such as rubber, is interposed between the side edges of adjacent slip segments. The filler strips 152 have a cross-sectional configuration the same as the configuration of the side edges of each slip segment. The purpose of the resilient filler strips is to maintain the slip segments, which are free to rotate on frusto-conical surface 129, equally spaced circumferentially to each other.

The respective side edges 150 and 151 of adjacent slip segments lie in a plane which intersects the axis of the belling head and forms a 5° angle with the belling head. However, the planes defining the respective side edges 150 of slip segments 141 converge, and hence, intersect at a location beyond flange 131. On the other hand, the planes defining the side edges 151 of slip segments 142 converge, and hence, intersect, but at a location beyond nose 126.

Filler strips 152 are bonded to only one edge of each slip segment so the facing edge of an adjacent segment is free to move relative to the filler strip. Advantageously, the filler strip is of such a width relative to the dimension of the slip segments that the outside surface 146 of the slip segment assembly is truly cylindrical and the tapered front surface of the slip segment assembly is truly frusto-conical, when the slip segment assembly is in the expanded position of FIG. 9, with rear shoulder 144 in engagement with transverse shoulder 134. It is to be noted with particularity, with reference to FIG. 9, that the distance between edges 150 and 151 and correspondingly, the width of filler strip 152 is relatively narrow compared with the offset 153 of the side edges of adjacent slip segments along the length of the cylindrical surface 146. This offset assures that the bell formed on the end of a length of pipe will have no internal ridges what could cause a leak between joined lengths of pipe. Were it not for this offset, ridges could be formed on the inside surface of the pipe. The expansion of the end of the pipe to form the bell 32 occurs as a result of straight line insertion of the belling head into the heat softened end of the pipe. Initial engagement of the front edge of a pipe with the slip segment assembly 127 causes the slip segment to move into engagement with shoulder 134 so the slip segments are fully expanded, as shown at FIG. 9. Because of the offset 153 of the side edges of each slip segment, a particular area of the inside surface of the pipe will be in engagement with a filler strip 152 for only a portion of its travel along the length of cylindrical portion 146 of the slip segments, and hence, no internal ridges are formed.

After the bell end 32 is formed on the pipe, air is forced through the cooling ring to cool the belled end while it is in engagement with the slip segment assembly 127. During such cooling, the bell end 32 of the pipe contracts. However, the slip assembly 127 remains in the position shown at FIG. 9, because of the 5° angle of frusto-conical surface 129 and inside surface 145 of the slip segments is self locking, and hence, the slip segments will not slide forwardly toward shoulder 139 when the bell end 32 contracts.

When bell end 32 is cooled to a temperature below the softening temperature of the material from which the pipe is formed, the belling head is withdrawn from the end of the pipe. During the initial movement of the belling head, slip segment assembly 127 remains in engagement with and moves with the bell end of the pipe. Movement of the slip segment assembly toward nose 126 allows the slip segment assembly to contract to a diameter smaller than the inside diameter of bell 32 and such contraction is assisted by engagement of the surface 140 with surface 147. In addition, as the slip segments contract, the resilient filler strips 152 are compressed, which causes them to expand radially and "pop" the pipe free from the polished surfaces of the slip segments. Hence, the belling head is readily withdrawn from the belled end 32 of the pipe.

Limit switch trip assembly 128 (FIG. 10) is secured to flange 131. This assembly includes a mounting block 160 having a pair of parallel counter-bore openings 161 with their axes parallel with the axis of belling head 17. Extending through each bore is a cap screw with an enlarged head 162, which extends into the bore. Between head 162 and a shoulder 163 of bore 161 is a compression spring 164. A trip plate 165 is connected to the screws for movement therewith. As shown at FIGS. 8–10, plate 165 is relatively thin and engages rear surface 159 of mounting block 160 when springs 163 are relaxed.

Also carried by flange 131 is a limit switch 166. Limit switch 166 is secured to the rear face of flange 131 and has an operating arm 167. Extending through arm 167 is an adjusting screw 168 which is adjusted so the switch is actuated when a pipe, completely seated on belling head 17, engages the heads 162 of the screws with its end edge 169 and moves them and the trip plate to the position of FIG. 9. In the fully seated position of the pipe, end edge 169 engages front face 149 of the flange 131.

As shown at FIG. 3, pipe transfer device 10 includes a pair of upright supports 175. Adjustably mounted on each support 175 is a support block 176. The connection between the support 175 and support block 176 includes a threaded connection which provides for vertical adjustment of the support block. A V-shaped transfer member 177 is pivotally supported on the support block by aligned pivot pins 178. The pivot pins support transfer member 177 for pivotal movement to and from the dotted line position of FIG. 3. Transfer member 177 is moved to and from these positions by a motor in the form of a pneumatically operated cylinder 179. The rod of the cylinder is connected to an arm (not shown) extending downwardly from transfer member 177 to a location somewhat below the axis of pivot pins 178. The other end of cylinder 179 is pivotally supported on the frame of the belling apparatus. Hence, when the cylinder 179 is actuated to extend its piston rod, pipe 5 is deposited on table 180 at the infeed side of the belling apparatus, and rolls from table 180 onto conveyor belts 8 and 9.

As shown at FIG. 3, outfeed conveyor 38 is positioned at the discharge side of the belling apparatus. Advantageously, this conveyor includes an elongated stop fence 181 which arrests the transverse travel of the pipe on the continuously driven outfeed conveyor belt 182. Conveyor belt 182 is driven by a motor 183 via a suitable drive mechanism, for example, a chain and sprocket drive.

CONTROL SYSTEM

Figure 11:
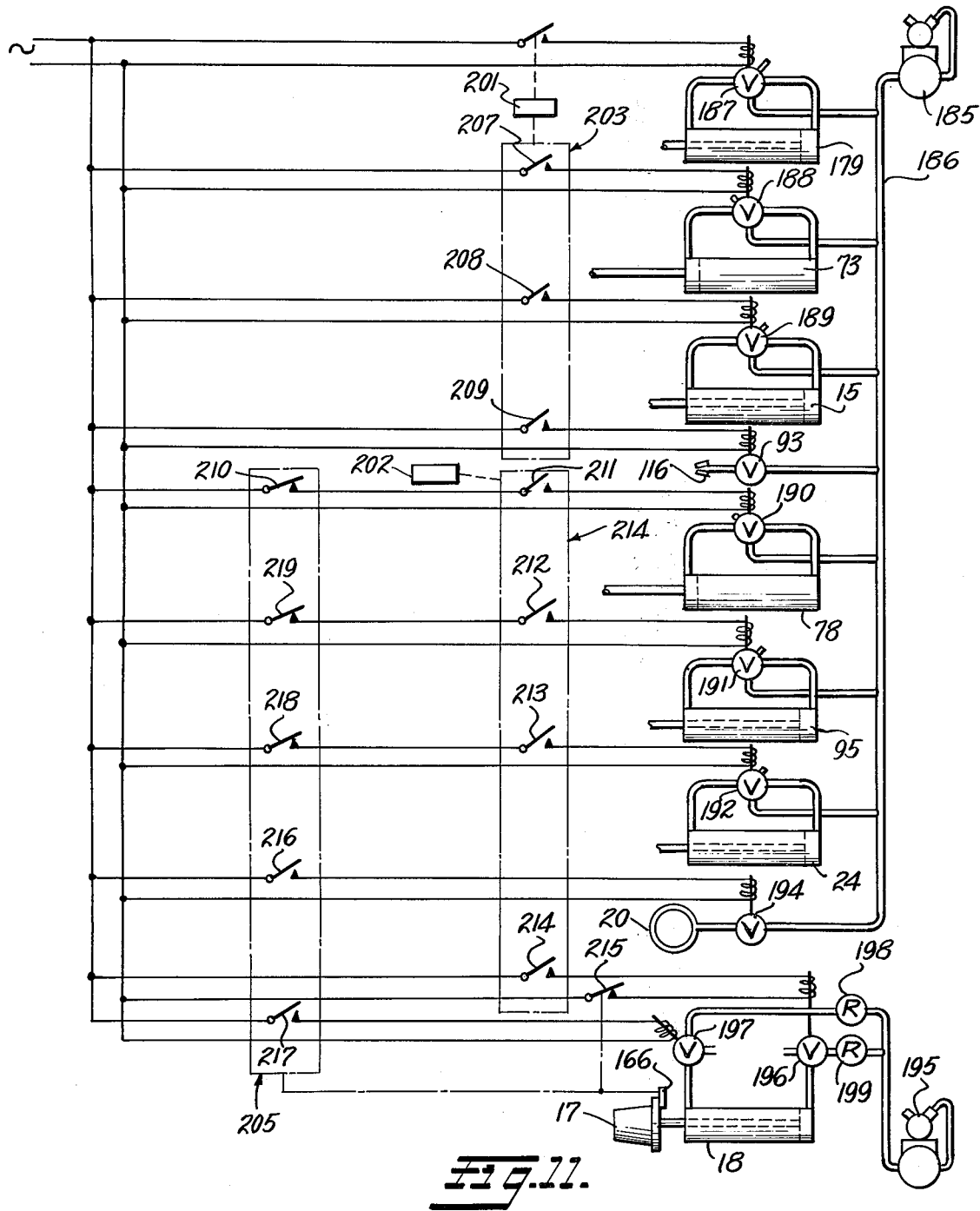
FIG. 11 is a diagrammatic view of the control system for the first embodiment of the belling apparatus of this invention.

FIG. 11 shows the control system which operates belling apparatus 1 to form a bell end on a length of plastic pipe without manual assistance. The control system includes a source of pressurized air 185 to which air motor cylinders 179, 73, 15, 78, 95, and 24 are connected via a header 186 and suitable pipe or tubing. Control valves 187–192 are provided for the respective cylinders. Each of control valves 187–192 is a four-way valve so connected to its cylinder that, in one position of the valve, air from source 185 is directed to the cylinder end and the piston rod end is vented, and in the other position of the valve air is directed to the rod end and the cylinder end is vented. Each of the valves 187–192 is solenoid operated. Valves 188 and 190 are so connected to the respective cylinders 73 and 78 that air from source 185 is directed to the cylinder or head end when the solenoid is unenergized, and to the piston rod end when the solenoid is energized. The valves 187, 189, 191 and 192 are so connected to their respective cylinders that air is supplied to the piston end of these cylinders when the solenoids for the valves are unenergized, and to the cylinder end when the solenoids are energized.

Cleaning air nozzle 116 is also connected to air pressure source 185. Valve 193, connected in the supply pipe for air nozzle 116, is solenoid operated and of the type which opens when its solenoid is energized and closes when its solenoid is unenergized.

Similarly, cooling air ring 20 is connected to source 185. Solenoid operated control valve 194 controls air flow to the cooling ring from the air pressure source. Valve 194 is solenoid operated and of the type which opens to supply air to the cooling ring when its solenoid is energized, and closes when the solenoid is unenergized.

Cylinder 18, which controls the advance and retraction of the belling head, advantageously has a source 195 of pressurized air separate from the source for the other air motors of the belling apparatus. The valve arrangement for operating cylinder 18 is somewhat different from the valves for the other air motors. Air is supplied to the head end of cylinder 18 through a control valve 196 which is of the three-way type, and a similar valve 197 controls air flow to the piston rod end of cylinder 18. Valve 196 is open and directs air to the head end of cylinder 18 when its solenoid is energized, and closes and vents the head end of the cylinder when its solenoid is unenergized. Valve 197, which controls air to the piston rod end of cylinder 18, works in the same manner. Air flow to both the piston rod end and head end of cylinder 18 is regulated by suitable pressure regulating valves 198 and 199 in the air lines for the respective ends of cylinder 18.

The automatic operation of belling apparatus 1 is controlled by limit switches which sense a length of plastic pipe at a particular location, an initiate the operation of timing devices which operate the several air motors of the belling apparatus in a predetermined sequence. In the preferred embodiment there are three limit switches. One is the switch 166 which is mounted on belling head 17, the second is the switch 201 which is located between stations 2 and 3 (FIG. 1) and the third is switch 202 which is located between stations 3 and 4. Switch 201 is located at a position beyond stop rods 25 and 26 so a pipe traveling from positioning station 2 to heating station 3 acutates the switch. Similarly, switch 202 is mounted beyond stop rods 27, 28 so a pipe moving from heating station 3 to belling station 4 operates switch 202.

Referring again to FIG. 11, switch 201 controls the operation of sequence timer 203, switch 202 controls the operation of sequence timer 204, and switch 166 controls the operation of timer 205. The solenoid controls for several air motors, cooling ring, and cleaning air nozzle are connected to a suitable electrical power supply via the several timers 203–205. This power source can, of course, be the usual 110 volt 60 cycle power supply.

DETAILED DESCRIPTION OF OPERATION

With the air motors of FIG. 11 in the positions shown, all the stop rods 25–30 are retracted, transfer device 10 is in the position shown at FIG. 3 where transfer member 177 is in its upright position, lift cradles 21 and 22 are retracted, clamp 23 is retracted, heating head 14 is retracted, and belling head 17 is retracted. For purposes of explanation, assume that a pipe is manually deposited on conveyor belts 8 and 9 which transport the pipe to the positioning station 2. Since stop rods 25, 26 are retracted, the pipe is not stopped at positioning station 2, but moves toward heating station 3. As the pipe travels toward heating station 3, switch 201 is actuated by the pipe and the switch initiates the operation of timer 203. As soon as switch 201 is actuated by the pipe, contacts 207 of the timer close to actuate valve 188 which causes air to flow to the piston rod end of cylinder 73, thereby retracting the piston rod and moving stop rods 25–28 to their elevated positions as shown at FIG. 1. After a short time delay, sufficient for the pipe to move into engagement with the now extended stop 27, 28, which align the pipe with heating head 14, as shown for the pipe 6 of FIG. 1, contacts 208 of timer 203 close and valve 189 is actuated to admit air to the cylinder end of cylinder 15, thereby advancing heating head 14 to the dotted line position of FIG. 1. Contacts 209 of timer 203 close shortly after contacts 208 close, sufficient time being provided for the heating head to move to its advanced position. When contacts 209 close, valve 193 opens and air is directed through cleaning nozzle 116 to blow debris and other foreign matter from the inside of the end of the pipe at the heating station. Contacts 209 open several seconds after they are closed to terminate the cleaning air blast. Contacts 208 remain closed for a sufficient predetermined period of time to allow the heating head to heat the end of the pipe to its softening temperature. As previously explained, the pipe is rotated by the conveyor belts 8 and 9 at the heating station so the end of the pipe is uniformly heated. After the elapse of the time for heating, contacts 208 open, air to cylinder 15 is reversed, and heating head 14 is retracted. After a short delay of perhaps one-half second, which provides time for the heating head to retract, contacts 207 open, cylinder 73 is reversed to retract stop rods 25–28, and the pipe is then free to be conveyed toward belling station 4 by the conveyor belts.

As shown at FIG. 11, control switches 201 also controls switch 210 which controls air cylinder 179 of transfer device 10. The arrangement is such that operation of switch 201 causes immediate operation of switch 210 so transfer member 177 is pivoted to feed a pipe to the conveyor. Switch 210 is advantageously of the time delay type which closes in response to operation of switch 201, but remains closed for only several seconds. Hence, cylinder 179 is operated to pivot transfer member 177 and return the transfer member to its upright position after several seconds delay. Since stop rods 25–28 are moving toward their extended positions at the time the transfer member is pivoted, the pipe so transferred will be moved to positioning station 2 and will be held there in readiness for transfer to heating station 3.

When stop rods 25–28 are lowered at the end of a heating cycle, the pipe is transported toward belling station 4 by the conveyor belts. (At the same time, a pipe at station 2 is transported toward station 3 and actuates switch 201 to initiate another heating cycle at the heating station.) The pipe traveling toward station 4 actuates control switch 202 which initiates the belling cycle. As soon as switch 202 is actuated, the operation of timer 204 is initiated.

Upon actuation of timer 204, contacts 211 immediately close so cylinder 78 is actuated to move stop rods 29, 30 to the extended position of FIG. 1. After a short time delay sufficient for the pipe to move into engagement with the stop rods, contacts 212 close to operate cylinder 95 which lifts lift cradles 21, 22 to elevate the pipe into precise axial alignment with the belling head. After another short time delay sufficient for the lift cradles to elevate, switch 213 closes to lower clamp 23 which clamps the pipe against cradle 22. Contacts 214 close at about the same time as contacts 213. When contacts 214 close, valve 196 opens to admit air to the cylinder end of cylinder 18, and thereby advance belling head 17. As the belling head advances, it enters the heat softened end of the pipe on the lift cradles. Initial engagement of the end of the pipe with slip segment assembly 127 causes the slip segment assembly to move to the position of FIG. 9 in which the slip segments are expanded. Further movement of the belling head forces the head into the end of the pipe so a cylindrical bell is formed. During this belling operation, axial movement of the pipe is resisted primarily by rear fence 13. When the pipe is fully seated on the belling head, as shown at FIG. 9, end edge 196 engages the limit switch trip assmebly and operates limit switch 166. Limit switch 166 immediately opens switch 215 which closes valve 196 and vents the cylinder end of cylinder 18. Hence, further forward movement of the belling head is immediately terminated when switch 166 is actuated.

Actuation of switch 166 initiates the cycle of operation of timer 205. As soon as switch 166 is actuated, contacts 216 of timer 205 close to open valve 194 and supply air to cooling ring 20. Air from the cooling ring is directed toward the bell end 32 of the pipe while the pipe is on the belling head as shown at FIG. 9. After a predetermined period of time sufficient for bell end 32 to cool below its softened temperature, contacts 216 open and close valve 193. Simultaneously, contacts 217 close to actuate valve 197 which admits air to cylinder 18 to retract belling head 17. During the initial retracting motion of belling head 17, slip segments 127 move relative to body 125 to the position of FIG. 10, where the slip segments are in contracted condition. With the segments so contracted, the surface presented by the segments is smaller than the inside diameter of bell 32, and belling head 17 can be readily withdrawn from the belled end of the pipe. After a time delay sufficient for withdrawal of belling head 17, timer 205 opens switch 218 which reverse valve 192 causes cylinder 24 to lift clamp 23. Simultaneously, contacts 219 open, thereby reversing cylinder 95 so lift cradles 21, 22 are lowered and the pipe is deposited on conveyor belts 8 and 9. Then, timer 205 opens contacts 220 which reverses cylinder 78 and retracts stop rods 29, 30. The pipe with the bell end formed thereon is then conveyed by conveyor belts 8 and 9 to outfeed conveyor 182 which carries the belled pipe away from the apparatus.

The pressure regualtors 198 and 199 are provided for cylinder 18 to regulate the pressure and air flow to the cylinder during advance movement and retracting movement of belling head 17. It is desirable to advance the head relatively slowly, or at a controlled rate, and such control is provided by the regulator 199. In addition, when the head is retracted, it is also desirable to control the rate of retraction and this is accomplished by the regulator 198.

SECOND EMBODIMENT

FIGS. 12-14 show a second embodiment of the bell end forming apparatus of this invention. The second embodiment is quite similar to the first embodiment, in that apparatus 220' as shown at FIG. 12, includes an infeed conveyor 11 which moves pipe to a transfer device 10 from which it is transferred to conveyor belts 8 and 9 which convey the pipe transversely of its length. Apparatus 220° includes a positioning station 2 identical to the positioning station described for the first embodiment, but which differs from the first embodiment in that there is a combined heating and bell end forming station 221. Station 221 includes a belling head 17 having an air cooling ring 20 moved by an air motor 18, these parts and their operation being identical to that described for the first embodiment. At station 221, there is also a lift mechanism including cradles 21 and 22 identical to those described for the first embodiment, and a clamp 23 also identical to that described for the first embodiment.

At station 2, there are stop rods 25 and 26 the same as those described for the first embodiment, and there are stop rods 222 and 223 which are identical to the stop rods 27 and 28 at heating station 3 of the first embodiment, and which are moved in unison with the stop rods 25 and 26. Station 221 also has a heating head 224, but this heating head differs substantially from the heating head 14 of the first embodiment. Heating head 224 is comprised of two semi-circular half sections 225, 226 which are separate from each other. Shell 225 has a heating element 227 and shell 226 has a heating element 228. In addition, an air cleaning nozzle 229 is mounted on back plate 230 of shell 226 to direct cleaning air through the pipe prior to forming a bell end on the pipe.

Shell 225 is connected to an air motor in the form of a cylinder 230 which has its axis vertical and extends upwardly above the shell. Shell 226 is connected to the piston rod of an air motor in the form of a cylinder 232 with its axis vertical, and which extends downwardly below shell 226. Cylinders 231 and 232 operate in unison to move the respective shells 225 and 226 from the retracted position, shown in solid lines at FIG. 13 (and also shown at FIG. 14) to the advanced position shown in dotted lines at FIG. 13 where the half shells 225 and 226 abut each other to form a cylindrical heating head to heat soften the end of the pipe before the bell end is formed on the pipe.

OPERATION - SECOND EMBODIMENT

The operation of the second embodiment of the apparatus at pipe transfer device 10 and at positioning station 2 is the same as for the first embodiment, in that pipe is deposited on the conveyor belts, is positioned at station 2, and is held in readiness for transfer to the next station. When stop rods 25, 26 are retracted, pipe 5 is conveyed toward station 221. During travel toward station 221, control switch 234 is actuated which causes stop rods 25, 26, as well as stop rods 222, 223 to be moved in their extended positions, as shown at FIG. 12. Switch 234 also initiates a heating cycle at station 221 which includes actuating cylinders 231 and 232 to move half shells 225 and 226 to the dotted line position of FIG. 13, so the half shells comprise a heating drum which surrounds front end 16 of a pipe engaging stop rods 222, 223 at station 221. The half shells 225, 226 are so extended that the horizontal plane where the half shells meet lies in a horizontal plane passing through the axis of a pipe at station 221. Immediately after half shells 225 and 226 close around the pipe, an air blast is directed through nozzle 229 to clean the inside of the end of the pipe at station 221. Since the pipe still engages conveyor belts 8 and 9, the pipe is rotated while in engagement with stop rods 222 and 223, (in the manner previously explained for the first embodiment), and correspondingly, end 16 of the pipe is uniformly heated during the heating operation.

After a sufficient length of time to heat end 16 to its softening temperature, half shells 225 and 226 are retracted, and retraction of half shells initiates a belling operation identical to that described for the embodiment of FIG. 1, in that cradles 21, 22 are actuated to lift the pipe into axial alignment with belling head 17, clamp 23 is lowered, the belling head is advanced to form the bell end on the pipe, limit switch 166 operates to control the length of the bell end formed on the pipe, cooling ring 20 cools the pipe while on belling head 17, the belling head is retracted after termination of the cooling operation, clamp 23 is lifted, cradles 21, 22 are lowered, and stop rods 222, 223 are retracted to allow conveyor belts 8 and 9 to transfer the pipe outfeed conveyor 31.

When stop rods 222, 223 are lowered, stop rods 25, 26 are simultaneously lowered and a pipe at station 2 is released for transfer by conveyor belts 8 and 9 to the station 221.

While several preferred embodiments of an apparatus for automatically forming a bell end on a length of thermoplastic pipe have been shown and described in detail, and while a preferred bell end forming arrangement has also been shown and described in detail, it is to be understood that numerous changes and substitutions can be made without departing from the scope of the invention as defined herein and in the appended claims.

What is claimed is:

1. In an apparatus for belling an end of a thermoplastic pipe, the combination of
   a belling head;
   means for positioning a pipe in axial alignment with said belling head comprising
      endless conveyor means arranged to move the pipe in a direction which is transverse both to the length of the pipe and said belling head, and
      means at the location of said belling head for receiving the pipe on said conveyor means, aligning the pipe with said belling head, and supporting the pipe in the resulting position of alignment;
   power means for effecting relative axial movement between said belling head and the adjacent end of the pipe to engage the belling head and pipe during belling to separate the belling head and pipe after belling;
   means for heating said end of the pipe to a softening temperature prior to engagement between said end and said belling head; and
   means for cooling said end of the pipe while the same is still engaged with said belling head.

2. The combination defined in claim 1, wherein
   said endless conveyor means is continuously driven; and
   said means for positioning the pipe comprises stop means movable between a retracted position, out of the path of travel of pipe on the conveyor means, and an active position, in which the stop means is disposed in the path of travel of the pipe in a location to engage and stop the pipe in general alignment with the belling head.

3. The combination defined in claim 2, wherein
   the axis of said belling head is spaced above the axis of a pipe when the pipe is supported on said conveyor means at the location of said belling head; and
   said means for receiving, aligning and supporting the pipe comprises lift means arranged to lift a pipe engaged by said stop means into axial alignment with said belling head.

4. The combination defined in claim 1, wherein
   said means for heating said end of the pipe comprises an annular heater structure dimensioned to surround said end of the pipe,
   the combination further comprising
   second power means for effecting relative movement between the pipe and said heater structure to establish operative positioning thereof.

5. The combination defined in claim 4, wherein
   said heater structure is mounted for axial movement into and out of surrounding relation with said end of the pipe.

6. The combination defined in claim 5, wherein
   said endless conveyor means is continuously driven;
   the combination further comprising
   stop means movable between a retracted position, out of the path of travel of pipe on the conveyor means, and an active position, in which the stop means is disposed in the path of travel of pipe on the conveyor means in a location to engage and stop the pipe when the same is axially aligned with said heater structure,
   the pipe being rotated by said conveyor means while in engagement with said stop means.

7. The combination defined in claim 4, wherein
   said heater structure comprises two generally semicircular units mounted for movement between operative positions, in which the two units cooperate to form an annular structure, and inactive positions, in which the two units are spaced from each other by a distance adequate to allow free lateral passage of the pipe; and
   said second power means is arranged to move said generally semi-circular heater units between said operative and inactive positions.

8. The combination defined in claim 1, wherein said belling means comprises
   mandrel body means having a nose and a frustoconical surface disposed with its small end toward said nose, and
   a plurality of transversely arcuate slip segments disposed in a circular series about said frustoconical mandrel surface, said segments being shorter than said frusto-conical mandrel surface, having inner surfaces in sliding engagement with said frusto-conical mandrel surface, and having arcuate outer surfaces which cooperate to define a cylindrical surface of a diameter equal to the desired inner diameter for the bell to be formed on the pipe, when said segments occupy a given axial position on said frusto-conical mandrel surface;
   relative axial movement in a direction to insert said belling head into the pipe causing said segments to engage said end of the pipe along said frustoconical mandrel surface to said given axial position;
   relative axial movement in the opposite direction tending to cause said segments to slide along said frusto-conical mandrel surface toward the nose of said mandrel body means, because of engagement of said segments with the pipe, whereby the assembly of slip segments is contracted to free the same from the pipe.

9. The combination defined in claim 1, wherein
   said belling head is mounted for axial movement toward and away from said end of the pipe when the pipe is supported in axial alignment therewith; and
   said cooling means comprises an annular coolant discharge device mounted for movement with said belling head and disposed concentrically therewith, the dimension of said coolant discharge device being such that said coolant device surrounds said end of the pipe when said belling head is operatively engaged with the pipe.

10. In an apparatus for belling an end of a thermoplastic pipe, the combination of
   a belling head;
   means for positioning a pipe in axial alignment with said belling head;

power means for effecting relative axial movement between said belling head and the adjacent end of the pipe to engage the belling head and pipe during belling and to separate the belling head and pipe after belling;

means for heating said end of the pipe to a softening temperature prior to engagement between said end and said belling head; and means for cooling said end of the pipe while the same is still engaged with said belling head, said belling head comprising mandrel body means having a nose which is directed toward said end of the pipe when the pipe is axially aligned with said belling head, and a frusto-conical surface tapering inwardly toward said nose, a plurality of slip segments arranged in a circular series about said frusto-conical mandrel surface, said segments being axially shorter than said frusto-conical mandrel surface, having inner surfaces in sliding engagement with said frusto-conical mandrel surface, and having outer surfaces which cooperate to define a cylindrical surface having a diameter equal to the inner diameter of the bell to be formed on the pipe when said segments are in a predetermined position spaced from the small end of said frusto-conical mandrel surface, and means for retaining said segments on said mandrel body means for free sliding movement axially along said frusto-conical mandrel surface, said outer surfaces of said segments constituting forming surfaces to shape said end of the pipe, said segments engaging the pipe during said relative axial movement and thereby being caused to slide on said frusto-conical mandrel surface axially away from the small end thereof to said predetermined position, relative axial movement between the pipe and said belling head in a direction to separate the same, aftr cooling of the belled end of the pipe, causing said segments to be pulled toward the small end of said frusto-conical surface by reason of engagement between rhe outer surfaces of said segments and the belled end of the pipe, and the taper of said frusto-conical mandrel surface then allowing said segments to move inwardly, whereby said belling head is freed from engagement with the belled end of the pipe.

11. The combination defined in claim 10, wherein the angle of taper of said frusto-conical mandrel surface is approximately 5° and said segments are restrained against axial movement relative to said frusto-conical mandrel surface, as the belled end of the pipe contracts during cooling, by their engagement with said mandrel surface.

12. The combination defined in claim 10, wherein each of said slip segments has opposite side faces; said segments are arranged in close side-by-side relation in said circular series; and said side faces of alternate ones of said slip segments in said series converge toward one end of said frusto-conical mandrel surfaces and said side faces of the others of said slip segments diverge in a direction toward said one end at approxiamtely the same angle as said side faces of said alternate segments converge, whereby adjacent side faces of mutually adjacent ones of said segments are generally parallel with each other, the extent of convergence and divergence of said side faces being greater than the circumferential distance between adjacent side faces of mutually adjacent ones of said segments when said segments are in said predetermined position on said frusto-conical mandrel surface, whereby formation of ridges on the inner surface of said end of the pipe by the edges of said segments as said belling head and the pipe are engaged is avoided.

13. The combination defined in claim 10, and further comprising a plurality of strips of resilient material each interposed between the side faces of a different adjacent pair of said slip segments, said strips maintaining said slip segments in predetermined circumferential relation to each other.

14. The combination according to claim 13, wherein said strips presenting outwardly facing, circumferentially narrow edges which form continuations of the outer surfaces of said slip segments when said ⁻lip segments are in said predetermined position.

15. Apparatus for forming a bell end on a thermoplastic pipe comprising a generally cylindrical belling head assembly;

means to move said belling head into the end of a pipe generally axially aligned with the belling head to form the bell end, and means to heat the end of the pipe prior to belling the end;

said belling head assembly comprising a tapered body;

a plurality of slip segments, each of arcuate curvature, surrounding said body in closely adjacent circumferential relation to each other said slip segments being slidable along said body to an expanded position in which the slip segments define an outer surface approximately a surface of revolution of the same size and form as the interior of the bell end formed on the pipe, and a contracted position in which the outer surface is smaller than the interior of the bell end to facilitate separating the pipe from the belling head;

each alternate slip segment on the body having opposite sides which converge in a direction toward one end of the body, and each of the other slip segments on the body having opposite sides which diverge in a direction toward said one end of the body;

the extent of divergence and convergence being greater than the distance between facing side edges of adjacent slip segments, when said slip segments are in said expanded position;

whereby, a ridge free interior bell end is formed on the pipe as a result of forcing the belling head axially into the pipe.

16. Apparatus according to claim 15 wherein a filler strip of resilient material extends between the side edges of each adjacent slip segments;

said filler strips, in said expanded position of said segments, presenting outwardly facing edges which form a continuation of slip segments at the spaces between segments.

* * * * *